United States Patent

Takishima et al.

[11] Patent Number: 5,892,881
[45] Date of Patent: Apr. 6, 1999

[54] METHOD AND APPARATUS FOR TRANSMITTING DUBBING DATA OF DIGITAL VTR

[75] Inventors: Yasuhiro Takishima; Shigeyuki Sakazawa, both of Tokyo; Masahiro Wada, Kanagawa, all of Japan

[73] Assignee: Kokusai Denshin Denwa Kabushiki Kaisha, Tokyo, Japan

[21] Appl. No.: 107,730

[22] Filed: Jun. 30, 1998

[30] Foreign Application Priority Data

Jul. 17, 1997 [JP] Japan ................................. 9-208500

[51] Int. Cl.[6] .............................. H04N 5/93; G11B 27/00
[52] U.S. Cl. ............................... 386/52; 356/112; 260/15
[58] Field of Search .............................. 386/4, 33, 52, 386/65, 66, 111, 112; 360/8, 13, 15; 369/83; 348/405, 419; 375/245

[56] References Cited

U.S. PATENT DOCUMENTS 4,823,333  4/1989  Satoh et al. ................................. 369/84
4,860,114  8/1989  Horikawa et al. ....................... 358/426

*Primary Examiner*—Wendy Garber
*Assistant Examiner*—Christopher Onuaku
*Attorney, Agent, or Firm*—Westman, Champlin & Kelly, P.A.

[57] ABSTRACT

An encoding control unit obtains a quantization step size and a video encoding rate Rc on the basis of various kinds of conditions including a transmission time and image quality specified through an input unit by a user, and property of image contents from a signal compression processing unit. Next, the video encoding rate Rc is compared with a network transmission rate Rt which is obtained through a network IF unit. Then, if the transmission rate Rt of the network is smaller than the video encoding rate Rc and is present in the range any of values of which is equal to or larger than the value smaller than Rc by a predetermined quantity, then the quantization step size is corrected in such a way that the video encoding rate Rc is equal to or smaller than the transmission rate Rt of the network, or in such a way that the video encoding rate Rc is increased. As a result, it is possible to provide an apparatus for transmitting dubbing data of a digital VTR which is capable of suppressing the degradation of a transmission throughput.

5 Claims, 6 Drawing Sheets

METHOD AND APPARATUS FOR TRANSMITTING DUBBING DATA OF DIGITAL VTR

BACKGROUND OF THE INVENTION

1. Field of the Invention

The present invention relates to a method and an apparatus for transmitting dubbing data of a digital VTR which are capable of enhancing a transmission throughput.

2. Description of the Related Art

In the case where the data which is recorded in the form of a digital format in a VTR is internationally dubbed in a remote place such as an associated country, conventionally, the dubbing is carried out through the transportation of the recording medium such as a magnetic tape. However, in this method, it takes a lot of time to carry out the dubbing. As a result, the higher speed processing has been required for the dubbing and hence the transmission through a network has been considered.

In the case where the digital data which has been reproduced by a digital VTR is transmitted to a remote place through a network, in order to realize the high speed operation, employing the double buffer system has been proposed. As shown in FIG. 8, a dubbing data transmission apparatus according to this double buffer system schematically consists of a digital VTR 51, a compression apparatus 52 for compressing the digital data which has been reproduced by the digital VTR 51, a double buffer 53 for carrying out alternately the operations of storing temporarily therein the data which has been compressed by the compression apparatus 52 and then of reading out the compressed data to output the data thus read out, and a network interface (IF) 54 for transmitting there through the data which has been read out through the double buffer 53 to a network 57. The double buffer 53 consists of a first buffer 53a and a second buffer 53b. In this connection, the data is stored in one of the buffers connected to an input side switch 55, while the data is read out from the other of the buffers connected to an output side switch 56. Both of the switches 55 and 56 are switched synchronously with each other.

However, in this dubbing data transmission apparatus according to the double buffer system, it is found out on the basis of the study made by the present inventors that there arises the problem that a null time in which no data is caused to flow through the network 57 may occur depending on the combination of both of the write speed at which the data is written to one of the buffers 53a and 53b (the encoding speed) and the read speed at which the data is read out from the other of the buffers 53a and 53b (the network speed) in some cases, so that the transmission throughput is necessarily reduced.

SUMMARY OF THE INVENTION

It is therefore an object of the present invention to provide a method and an apparatus for transmitting dubbing data of a digital VTR which are capable of suppressing the degradation of a transmission throughput.

To accomplish the above described objects, the present invention is firstly characterized in that, in the case where a transmission rate Rt of said network is smaller than a video encoding rate Rc and is present in a range any of values of which is equal to or larger than the value smaller than Rc by a predetermined quantity, and the range is divided into a first range and second range (any of values in the first range>any of values in the second range), when the transmission rate Rt is present in the first range, a quantization step size Q is corrected in such a way that the video encoding rate Rc is equal to or smaller than the transmission rate Rt of said network.

The present invention is secondly characterized in that, when the transmission rate Rt is present in the second range, the quantization step size Q is corrected in such a way that the video encoding rate Rc is increased.

According to the features of the present invention, by correcting the video encoding rate Rc as described above, both of the write speed at which the data is written to the double buffer (the encoding speed) and the read speed at which the data is read out from the double buffer (the network speed) can be matched with to each other. As a result, the null time in which no data is caused to flow through the network can be removed or reduced, and in addition thereto, the lowering of the transmission throughput can be either prevented or reduced.

DETAILED DESCRIPTION OF THE PREFERRED EMBODIMENTS

Figure 6:
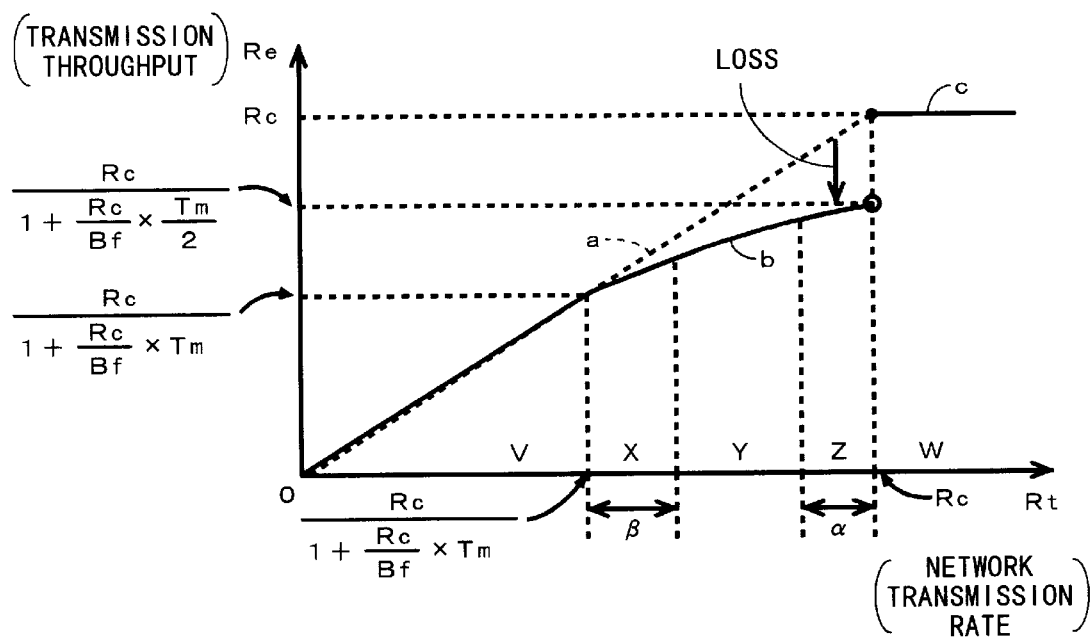
FIG. 6 is a graphical representation showing the relation between a network transmission rate Rt and a transmission throughput Re in an apparatus employing a double buffer.
Figure 8:
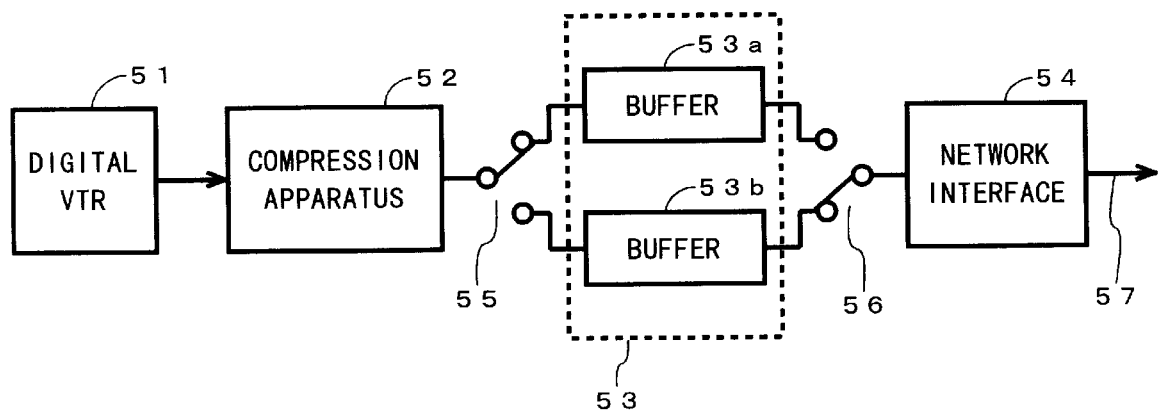
FIG. 8 is a block diagram showing a configuration of a conventional apparatus for transmitting dubbing data of a digital VTR.

A preferred embodiment of the present invention will hereinafter be described in detail with reference to the accompanying drawings. First, the principles of the present invention will now be described with reference to FIG. 6. FIG. 6 is a characteristic graphical representation which is obtained by the study of the present inventors and which is useful in explaining the relation between a network transmission rate Rt (corresponding to the axis of abscissa) and a transmission throughput Re (corresponding to the axis of ordinate) in an apparatus employing a double buffer in FIG. 8. In the figure, reference symbol Rc designates a video encoding rate, reference symbol Bf a buffer size, and reference symbol Tm the relation of Tm=T0+Ti+Te. As will be apparent from FIG. 7 described later, Tm is a time period which is required for when the processing proceeds to the next reproduction after having stopped temporarily the reproduction of a digital VTR, the reproduced data before and after stopping to maintain continuity, T0 is an overrun time in stopping, Ti is a rewind time, and Te is a preroll time which is required for the digital VTR to rise up to the normal read speed. In addition, a straight line a represents the ideal curve in which the transmission throughput Re is increased proportionally as the network transmission rate Rt is increased from 0 up to the video encoding rate Rc.

According to the study made by the present inventors, it is found out that when the network transmission rate Rt fulfills the relation of $0<Rt<Rc/\{1+(Rc/Bf)\times Tm\}$, the transmission throughput Re is equal to the network transmission rate Rt and hence follows faithfully the straight line a, while when the relation of $Rc/\{1+(Rc/Bf)\times Tm\} \leq Rt<Rc$ is established, the transmission throughput Re is degraded so that it follows faithfully a curve b, and in addition thereto, in the region of Rt>Rc, the transmission throughput Re is equal to the video encoding rate Rc.

Figure 7:
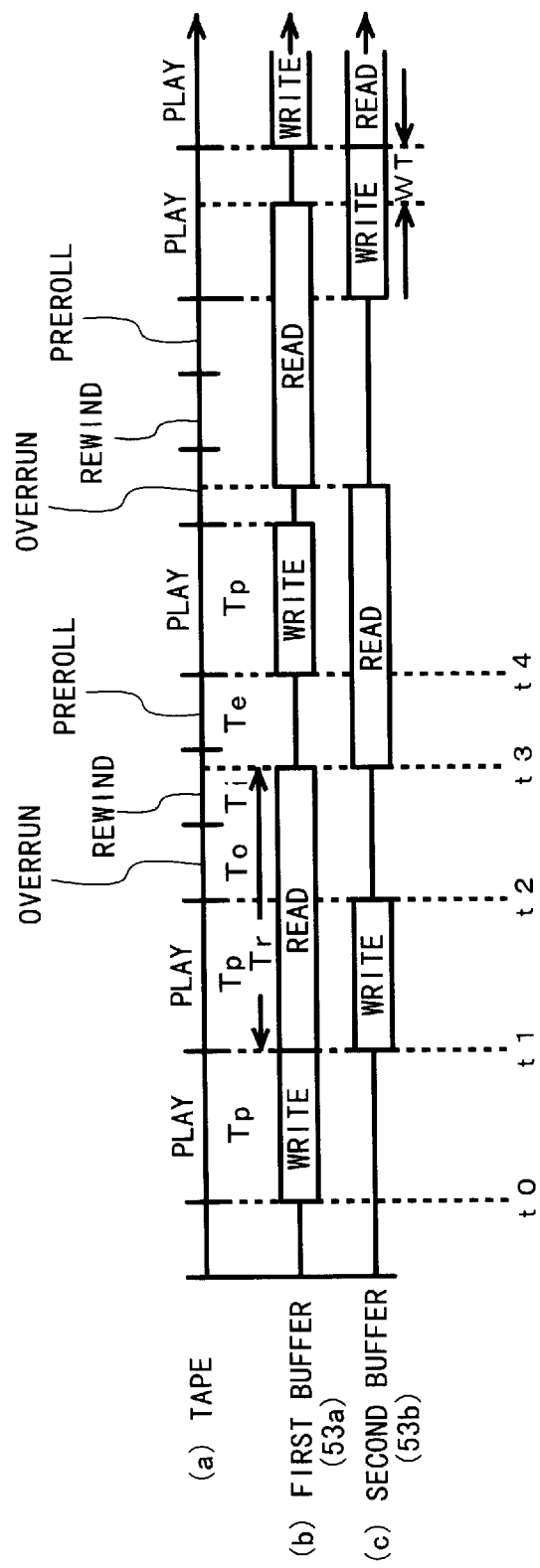
FIG. 7 is a timing chart showing the tape operation of a digital VTR and the operation of writing/reading out data to/from a first/second buffer.

Incidentally, the reason that the transmission throughput Re is degraded when the relation of $Rc/\{1+(Rc/Bf)\times Tm\} \leq Rt<Rc$ is established is that as shown in FIG. 7, the operation of reading out the data from one of the buffers results in the waiting for the operation of writing the data to the other of the buffers and as a result the null time WT occurs in which no data is caused to flow through the network. A part (a) of FIG. 7 shows a timing chart of the motion of the magnetic tape of the digital VTR 51 (play, overrun, rewind, preroll and the like), a part (b) shows a timing chart of the operation of writing and reading the data to and from the first buffer 53a, and a part (c) shows a timing chart of the operation of writing and reading the data to and from the second buffer 53b.

First, assuming that the data is written to the first buffer 53a during a time period ranging from t0 up to t1, then at a time point t1, the input side switch 55 is connected to the second buffer 53b, and the output side switch 56 is connected to the first buffer 53a. Then, during a time period ranging from t1 up to t3, the data is read out from the first buffer 53a, while during a time period ranging from t1 up to t2, the data is written to the second buffer 53b. If at a time point t2, the operation of writing the data to the second buffer 53b has been completed, then the reproduction of the magnetic tape of the digital VTR 51 is temporarily stopped. At this time, since the magnetic tape overruns due to inertia, the magnetic tape needs to be rewound by a total length of the tape length of the overrun and the length corresponding to the time period which is obtained when expecting the preroll time required for the magnetic tape to rise up to a predetermined tape speed in the next reproduction. In other words, if the reproduction of the magnetic tape is temporarily stopped, then the time Tm=T0+Ti+Te is required at minimum. When the above-mentioned operation is repeatedly carried out, a time occurs in which no data is read out from either the first or second buffer 53a or 53b during a time period ranging from a time point when the second read operation of the first buffer 53a has been completed un to a time point when starting the second read operation of the second buffer 53b, i.e., the null time WT occurs in which no data is caused to flow through the network. This is the reason that the transmission throughput Re is degraded when the relation of $Rc/\{1+(Rc/Bf)\times Tm\} \leq Rt<Rc$ is established.

Figure 1:
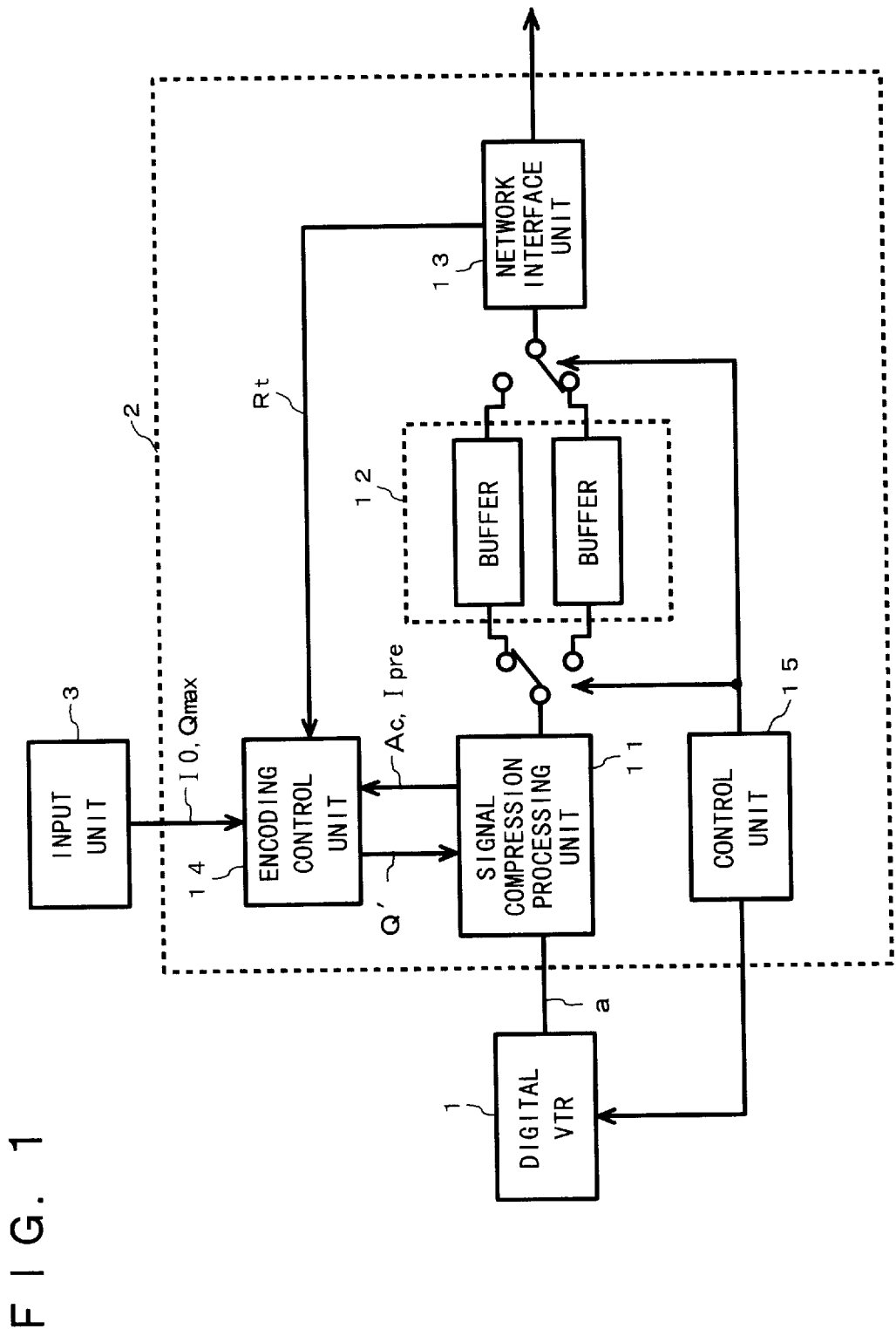
FIG. 1 is a block diagram showing a schematic configuration of an embodiment according to the present invention.

Next, the description will hereinbelow be given by an embodiment of the present invention which is designed in such a way that the degradation of the transmission throughput Re is either prevented or reduced. FIG. 1 is a block diagram showing a schematic configuration of an apparatus for transmitting dubbing data of a digital VTR.

In the figure, reference numeral 1 designates a digital VTR, reference numeral 2 a dubbing data transmission apparatus, and reference numeral 3 an input unit through which an operator inputs the data. As apparent from the figure, the dubbing data transmission apparatus 2 includes, but is not limited to, a signal compression processing unit 11 such as a JPEG or an MPEG, a double buffer 12, a network interface unit 13, an encoding control unit 14 and a control unit 15.

The network interface unit 13 sends the compressed data which has been read out from the double buffer 12 to a network (e.g., an ATM) and also outputs the network transmission rate Rt to the encoding control unit 14. As will become apparent from the description which will be made later, the encoding control unit 14 determines a quantization step size Q' in which the better transmission throughput Be can be obtained on the basis of the parameters (e.g., the transmission time and the minimum image quality) which have been inputted through the input unit 3 by a user, the network transmission rate Rt outputted from the network interface unit 13, and the encoding state image property data (e.g., the activity and the amount of occurred information of the preceding frame) outputted from the signal compression processing unit 11, and then the quantization step size Q' thus determined are outputted to the signal compression processing unit 11. Then, it is obvious that when the quantization step size Q' is increased, the signal compression processing unit 11 operates to decrease the encoding rate Rc, while when the quantization step size Q' is decreased, the signal compression processing unit 11 operates to increase the encoding rate Rc. In addition, the control unit 15 controls the switching of the switches associated with the double buffer 12 and also controls the driving of the magnetic tape of the digital VTR 1.

Figure 2:
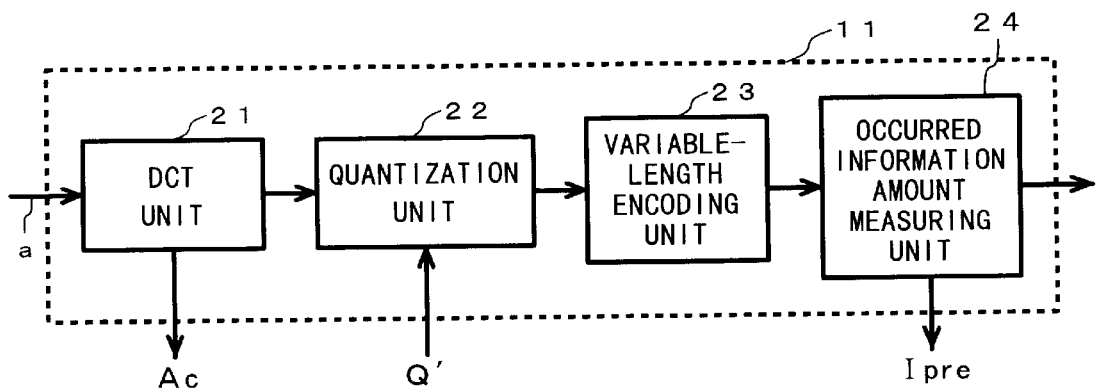
FIG. 2 is a block diagram showing a schematic configuration of one example of a signal compression processing unit shown in FIG. 1.

Next, one concrete example of the signal compression processing unit 11 will hereinbelow be described with reference to FIG. 2. FIG. 2 shows a schematic configuration of a JPEG which includes, but is not limited to, a DCT unit 21 for DCT-converting digital data a which has been reproduced by the digital VTR 1, a quantization unit 22 for quantizing the signal which has been obtained through the DCT, a variable-length encoding unit 23, and a unit 24 for measuring the amount of occurred information. The DCT unit 21 outputs an activity Ac representing fineness and the like of a pattern. In addition, the occurred information amount measuring unit 24 outputs the data relating to the amount of occurred information of the preceding frame Ipre. On the other hand, the quantization unit 22 receives the quantization step size Q' from the encoding control unit 14 to carry out the quantization in accordance with the quantization step size Q' thus received.

Figure 3:
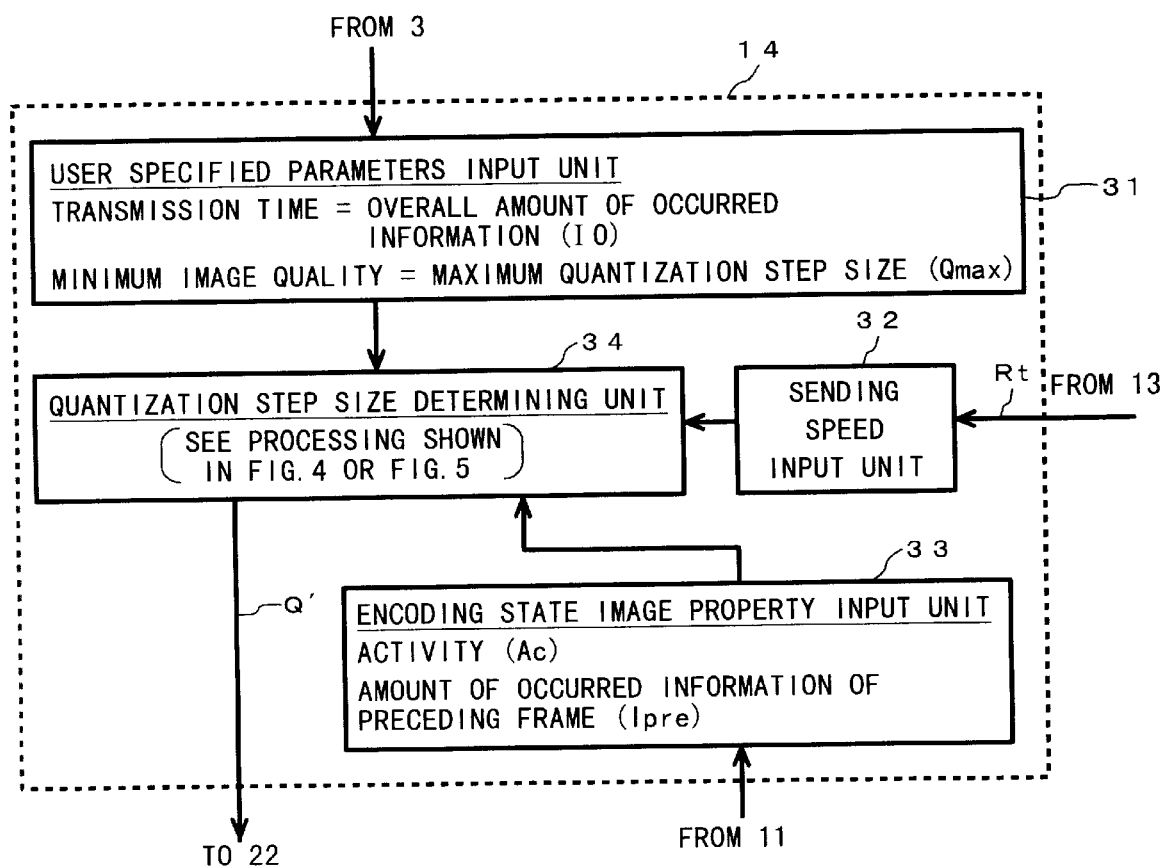
FIG. 3 is a block diagram showing a schematic configuration of one example of an encoding control unit shown in FIG. 1.

Next, one concrete example of the encoding control unit 14 will hereinbelow be described with reference to FIG. 3. As shown in the figure, the encoding control unit 14 includes, but is not limited to, a user specified parameters input unit 31, a sending speed input unit 32, an encoding state image property input unit 33, and a quantization step size determining unit 34.

The overall amount of occurred information IO based on which the transmission time is determined, and the maximum quantization step size Qmax based on which the minimum image quality is determined are inputted as the parameters from the input unit 3 to the user specified parameters input unit 31 which sends in turn these parameters inputted thereto to the quantization step size determining unit 34. The network transmission rate Rt is inputted as the parameter through the network interface unit 13 to the sending speed input unit 32 which sends in turn the parameter thus inputted thereto to the quantization step size determining unit 34. In addition, the activity Ac and the amount of occurred information of the preceding frame Ipre are inputted as the parameters from the signal compression processing unit 11 to the encoding state image property input unit 33 which sends in turn these parameters thus inputted thereto to the quantization step size determining unit 34. Incidentally, if the signal compression processing unit 11 is comprised of the MPEG, then the magnitude information of the motion will be applied to the encoding state image property input unit 33.

Next, one example of the processing executed by the quantization step size determining unit 34 will hereinbelow be given with reference to the flow chart shown in FIG. 4.

Figure 4:
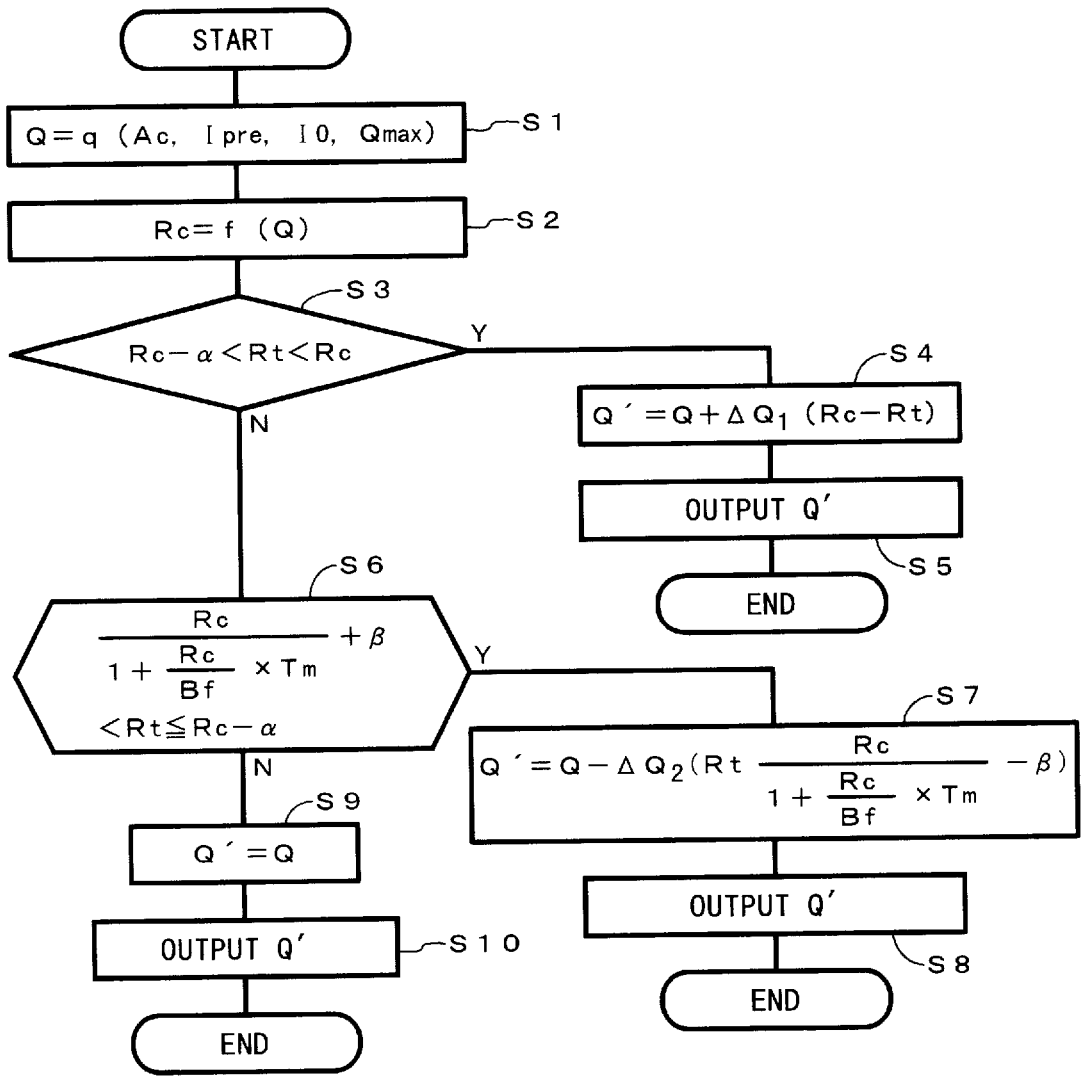
FIG. 4 is a flow chart showing one example of the operation of the encoding control unit.

In Step S1 in FIG. 4, the quantization step size Q is determined on the basis of $Q=q(Ac, Ipre, IO, Qmax)$ where Q is the quantization step size which is determined without taking the network conditions into consideration, and q is the function which is used to determine the quantization step size on the basis of the various kinds of conditions, e.g., the above-mentioned Ac, Ipre, IO, Qmax and the like. In this connection, the function q is known.

In Step S2, the encoding rate Rc is obtained on the basis of $Rc=f(Q)$ where f is the function which is used to determine the encoding rate on the basis of the quantization step size and as which the known function can be employed.

In Step S3, it is judged whether or not the relation of $Rc-\alpha<Rt<Rc$ is established where $\alpha$ is, as shown in FIG. 6, the parameter representing the degree of the vicinity of Rc. The step S3 means adjudgement whether or not Rt belongs to the region Z shown in FIG. 6. Then, if the judgement made in Step S3 is affirmative, then the processing proceeds to Step S4 in which the quantization step size Q' outputted from the quantization step size determining unit 34 is determined on the basis of the following expression:

$$Q'=Q+\Delta Q1(Rc-Rt)$$

where $\Delta Q1$ is the function giving the quantization step size change difference value which is required to make the encoding rate Rc obtained in Step S2 equal to or lower than the network transmission rate Rt. In Step S5, the quartization step size Q' is outputted. Incidentally, the encoding rate Rc' which is determined on the basis of the quantization step size Q' is expressed by $Rc'=f(Q')$ As a result, the encoding rate Rc' becomes equal to or lower than the network transmission rate Rt (i.e., $Rt \geq Rc'$), and also as apparent from FIG. 6, the transmission throughput Re can be enhanced up to the value which is approximately equal to the video encoding rate Rc'.

On the other hand, if the judgement made in Step S3 is negative, then the processing proceeds to Step S6 in which it is judged whether or not the following relation is established:

$$Rc/\{1+(Rc/Bf) \times Tm\}+\beta<Rt \leq Rc-\alpha$$

In other words, it is judged whether or not Rt belongs to the region Y shown in FIG. 6. In this connection, $\beta$ is the parameter representing the allowable range of the loss in the throughput. If the judgement made in Step S6 is affirmative, then the processing proceeds to Step S7 in which the quantization step size Q' outputted from the quantization step size determining unit 34 is determined on the basis of the following expression:

$$Q'=Q-\Delta Q2[Rt-Rc/\{1+(Rc/Bf) \times Tm\}-\beta]$$

where $\Delta Q2$ is the function giving the quantization step size change difference value which is required to increase the encoding rate Rc which has been obtained in Step S2. Then, in Step S8, the quantization step size Q' thus determined is outputted. Incidentally, the encoding rate Rc' which is determined on the basis of the quantization step size Q' is expressed by the expression of $Rc'=f(Q')$.

As a result, the encoding rate Rc' is corrected in such a way that it is increased. Referring now to FIG. 6, as the encoding rate Rc is increased, the gradient of the ideal curve a is changed so as to be decreased so that the ideal curve a becomes near the curve b in the region Y. As a result, it is possible to enhance the transmission throughput Re in the range Y.

On the other hand, if the judgement in Step S6 is negative, then since Rt belongs to either the region X or V of FIG. 6 and hence the loss in the throughput is small, the relation of Q'=Q is established in Step S9. Then, in Step S10, the quantization step size Q' is outputted.

As described above, if the quantization is carried out in the signal compression processing unit 11 using the quantization step size Q' which has been determined in FIG. 4, then the time period required to write the data to the associated buffer can be shortened down to the magnitude which is suitable for the network transmission rate Rt. As a result, it is possible to remove or reduce the null time WT in which no data is caused to flow through the network due to employing the double buffer, and hence it is possible to enhance the transmission throughput.

Figure 5:
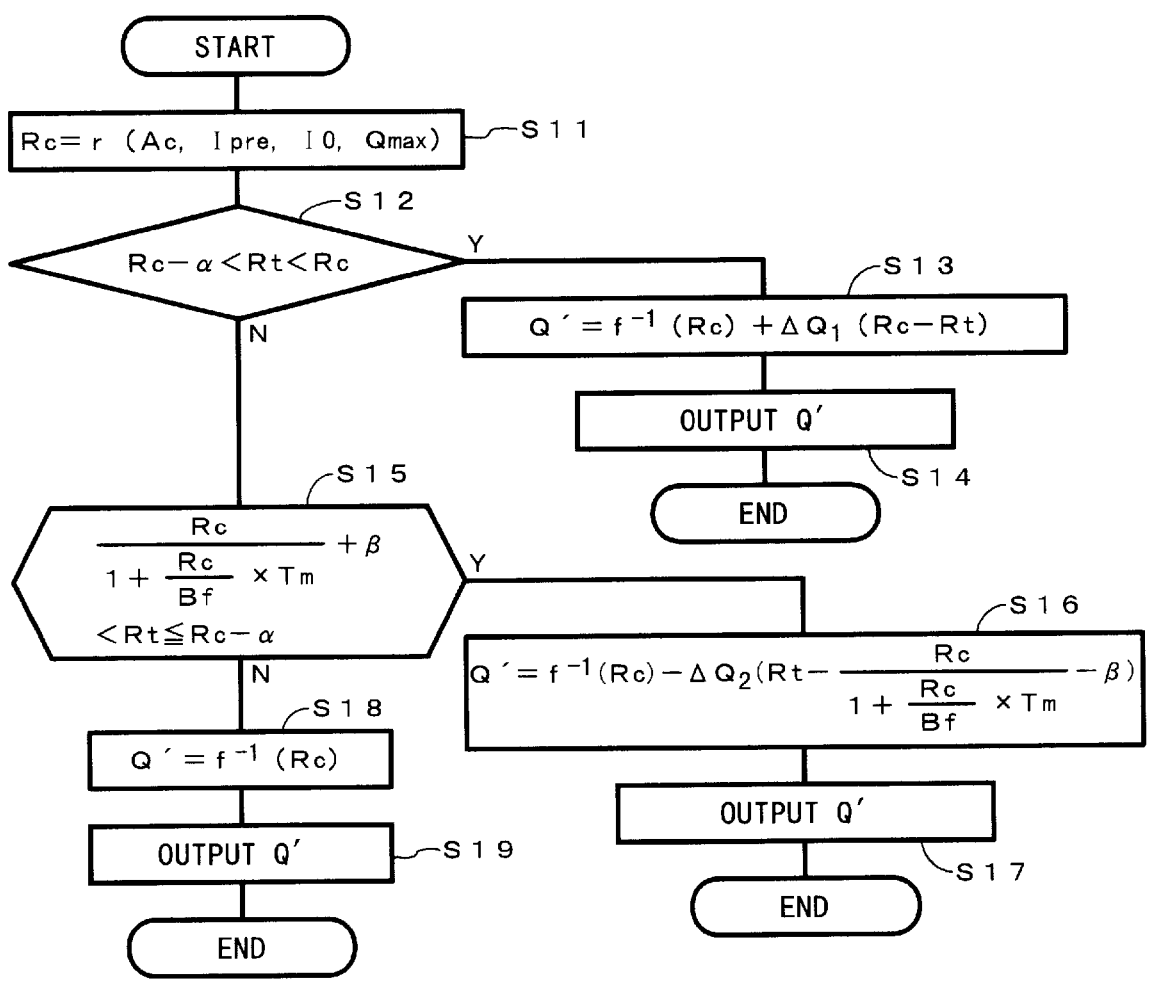
FIG. 5 is a flow chart showing another example of the operation of the encoding control unit.

Next, another example of the processing executed in the quantization step size determining unit 34 will hereinbelow be described with reference to the flow chart shown in FIG. 5. This processing example is such that the control is carried out using mainly the encoding rate Rc. In Step S11 shown in FIG. 5, the encoding rate Rc is determined on the basis of the expression of $Rc=r(Ac, Ipre, IO, Qmax)$ where r is the function which is used to determine the encoding rate on the basis of the various kinds of conditions.

In Step S12, it is judged whether or not the relation of $Rc-\alpha<Rt<Rc$ is established. This judgement is the same as that made in Step S3 of FIG. 4. If it is judged in Step S12 that the relation of $Rc-\alpha<Rt<Rc$ is established, then the processing proceeds to Step S13 in which the quantization step size Q' outputted from the quantization step size determining unit 34 is determined on the basis of the following expression:

$$Q'=f^{-1}(Rc)+\Delta Q1(Rc-Rt)$$

where the function $\Delta Q1$ is the same as that in Step S4 of FIG. 4. Then, in Step S14, the quantization step size Q' is outputted through the quantization step size determining unit 34.

On the other hand, if it is judged in S12 that the relation of $Rc-\alpha<Rt<Rc$ is not established, then the processing proceeds to Step S15. The judgement made in Step S15 is the same as that in Step S6 of FIG. 4. If the judgement made in Step S15 is affirmative, then the processing proceeds to Step S16 in which the quantization step size Q' is obtained on the basis of the following expression:

$$Q'=f^{-1}(Rc)+\Delta Q2[Rt-Rc/\{1+(Rc/Bf) \times Tm\}-\beta]$$

Then, in Step S17, the quantization step size Q' is outputted from the quantization step size determining unit 34.

On the other hand, if the judgement made in Step S15 is negative, then the processing proceeds to Step S18 in which the quantization step size Q' is obtained on the basis of the expression of $Q'=f^{-1}(Rc)$. Then, in Step S19, the quantization step size Q' is outputted through the quantization step size determining unit 34.

As set forth hereinabove, according to the present embodiment, in the encoding control unit 14, the quantization step size Q which is obtained on the basis of the expression of Q=q(Ac, Ipre, IO, Qmax) is not directly outputted to the signal compression processing unit 11, but is corrected on the basis of the relation of the magnitude of the encoding rate Rc which is calculated on the basis of the quantization step size Q and the magnitude of the network transmission rate Rt to be outputted to the signal compression processing unit 11. As a result, it is possible to suppress the degradation of the transmission efficiency.

As apparent from the description made hereinabove, according to the present invention, a network transmission rate Rt is adopted as an element for determining a video encoding rate Rc, and the video encoding rate Rc is corrected as defined in claim 1 or 2. Therefore, it is possible to remove or reduce a null time in which no data is caused to flow through a network and also it is possible to prevent or reduce the lowering of a transmission throughput.

What is claimed is:

1. A method of transmitting dubbing data of a digital VTR in which reproduced data which is compressed is sent to a network through a double buffer, said method being characterized in that:

in the case where a transmission rate Rt of said network is smaller than a video encoding rate Rc and is present in a range any of values of which is equal to or larger than the value smaller than Rc by a predetermined quantity, and the range is divided into a first range and second range any of values in the first range>any of values in the second range), when the transmission rate Rt is present in the first range, a quantization step size Q is corrected in such a way that the video encoding rate Rc is equal to or smaller than the transmission rate Rt of said network.

2. A method of transmitting dubbing data of a digital VTR according to claim 1, wherein when the transmission rate Rt is present in the second range, the quantization step size Q is corrected in such a way that the video encoding rate Rc is increased.

3. A method of transmitting dubbing data of a digital VTR according to claim 1, wherein the lower limit of the second range is determined on the basis of the video encoding rate Rc, a size Bf of a buffer for use in said double buffer, and the total time Tm of overrun, rewind and preroll of the tape of said digital VTR.

4. An apparatus for transmitting dubbing data of a digital VTR in which reproduced data which is compressed is sent to a network through a double buffer, said apparatus comprising:

a quantization unit;

a signal compression processing unit including said quantization unit for signal-compressing the reproduced data; and an encoding control unit for sending a control signal with a quantization step size to said quantization unit of said signal compression processing unit, said encoding control unit comprising:

means for obtaining a quantization step size Q on the basis of various kinds of conditions including a transmission time a nd image quality specified by a user, and property of image contents and for obtaining the relation between a video encoding rate Rc which is obtained on the basis of the quantization step size Q and a transmission rate Rt of said network;

correction means for correcting, in the case where the transmission rate Rt of said network is smaller than the video encoding rate Rc and is present in a range any of values of which is equal to or larger than the value smaller than Rc by a predetermined quantity, and the range is divided into a first range and second range (any of values in the first range>any of values in the second range), when the transmission rate Rt i s present in the first range, the quantization step size Q in such a way that the video encoding rate Rc is equal to or smaller than the transmission rate Rt of said network; and means for outputting the corrected quantization step size Q'.

5. An apparatus for transmitting dubbing data of a digital VTR according to claim 4, further comprising:

correction means for correcting, in the case where the transmission rate Rt of said network is smaller than the video encoding rate Rc and is present in a range any of values of which is equal to or larger than the value smaller than Rc by a predetermined quantity, and the range is divided into a first range and second range (any of values in the first range>any of values in the second range), when the transmission rate Rt is present in the second range, the quantization step size Q in such a way that the video encoding rate Rc is increased; and means for outputting the corrected quantization step size Q'.

* * * * *